Patented Oct. 3, 1950

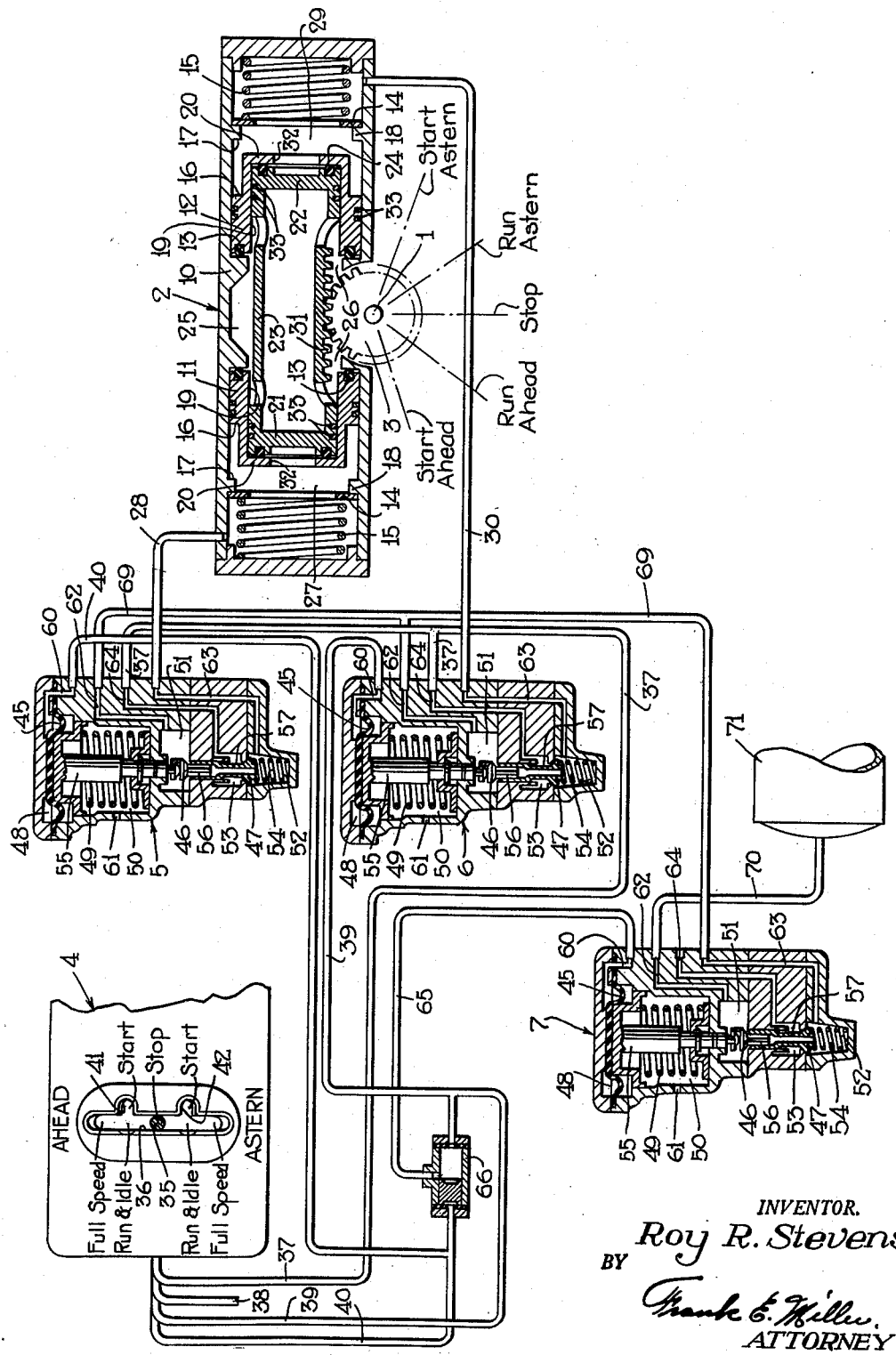

2,524,488

UNITED STATES PATENT OFFICE 2,524,488

FLUID PRESSURE CONTROL APPARATUS

Roy R. Stevens, Forest Hills, Pa., assignor to The Westinghouse Air Brake Company, Wilmerding, Pa., a corporation of Pennsylvania Application March 13, 1948, Serial No. 14,798

4 Claims. (Cl. 121—38)

This invention relates to fluid pressure control apparatus, and more particularly to the type for controlling a plurality of operations in a desired sequence.

In reversible Diesel engines, a maneuvering shaft is usually provided which is connected with reversing valve and timing mechanism, or the like, and is operable to various positions for effecting desired operations for starting, running, stopping and reversing of the Diesel engine.

It is proposed that a fluid pressure motor in the form of a multiple position cylinder device be employed for positioning a shaft such as the above mentioned maneuvering shaft, and it is the principal object of this invention to provide improved fluid pressure control means for controlling operation of such a motor.

Other objects and advantages will hereinafter become obvious from the following detailed description of the invention.

In the accompanying drawing, the single figure is a diagrammatic view of fluid pressure control apparatus, including a multiple position cylinder device, for controlling a plurality of operations in a desired sequence and embodying the invention.

In the accompanying drawing, the single figure is a diagrammatic view of fluid pressure apparatus, including a multiple position cylinder device, for controlling a plurality of operations in a desired sequence and embodying the invention.

Description

Referring to the drawing, reference numeral 1 designates a rockable maneuvering shaft which may be operatively connected, in any suitable manner, to valve or timing gear for effecting necessary operations in starting and operating a reversible Diesel engine, for example, in either one direction or the other. Reference numeral 2 designates a fluid pressure motor in the form of a multiple position cylinder device operatively connected to the shaft 1 through a pinion or gear 3. Reference numeral 4 designates an operator's control valve device and reference numerals 5, 6, 7 designate respective relay valve devices which are arranged to cooperate with the operator's control valve device 4 for controlling operation of the multiple position cylinder device 2.

Shaft 1 is rockable to five angular positions, which positions may correspond to positions for maneuvering control of a reversible Diesel engine and therefore are indicated in the drawing by dot-and-dash lines bearing the titles, respectively, "Stop" (a center position), "Run Ahead" and "Start Ahead" at one side of "Stop" position, and "Run Astern" and "Start Astern" at the opposite side of "Stop" position.

The multiple position cylinder device 2 may comprise a hollow casing 10 having two coaxially arranged spaced apart pistons 11, 12 slidably mounted in suitable bores formed therein. Pistons 11, 12 are limited in movement inwardly, as viewed in the drawing, by engagement with respective stop shoulders 13. Outward movement of pistons 11, 12 first brings said pistons into engagement with respective stop washers 14. Further movement of pistons 11, 12 in the same direction carries washers 14 with said pistons against action of respective compression springs 15 which are arranged to oppose such movement. The extent of outward movement of pistons 11, 12 against springs 15 is limited by engagement of respective shoulders 16 formed therein with shoulders 17 formed in one face of respective annular ribs 18 associated with the casing. The opposite face of each rib 18 forms a seat for the washer 14 which is urged toward said rib by spring 15.

Each piston 11, 12 is provided with a central bore 19 partially closed at one end by a wall 20 encircling an opening 32. Two spaced apart oppositely arranged pistons 21, 22, attached one with the other by a hollow rod 23, common to both, are slidably disposed in the bores 19 in pistons 11, 12, respectively. A resilient ring 24 is carried by each piston 21, 22 for engagement with an inner face of the wall 20 in the respective piston 11, 12. A common side of each of the pistons 11, 21 and 12, 22 is subject to atmospheric pressure in a chamber 25 formed between the pistons and which opens to atmosphere by way of an opening 26 in the casing. The opposite or outer sides of pistons 11, 21 are exposed to pressure of fluid in a chamber 27 which is adapted to be supplied with fluid under pressure by way of a pipe 28. Similarly, the opposite or outer sides of pistons 12, 22 are exposed to pressure of fluid in a pressure chamber 29 which is adapted to be supplied with fluid under pressure via a pipe 30. A rack 31 is associated with the hollow rod 23 for operative engagement with the pinion 3, which pinion fits into the opening 26 in casing 10. Opening 32 in piston 11 opens chamber 27 to the outer face of piston 21, and opening 32 in piston 12 opens chamber 29 to the outer face of piston 22. Sealing rings 33 are provided on pistons 11, 12, 21, 22 to prevent leakage of fluid under pressure past them from one side to the other.

In operation, when both pressure chambers 27, 29 are charged with fluid under pressure pistons 11 and 12 are urged thereby to the position in which they are shown in the drawing, in contact with the respective shoulders 13 due to which, the engagement of said pistons with pistons 21 and 22 actuate the latter pistons and the connecting rod 23 and pinion 3 to turn shaft 1 to its "Stop" position, in which it is shown in the drawing.

If chambers 27, 29 are subsequently vented to atmosphere, the device 2 remains in the position in which it is shown in the drawing.

If fluid under pressure is then supplied to chamber 27 while chamber 29 remains open to atmosphere, pressure of fluid in said chamber 27 acting on piston 21 will cause its movement, as well as movement of the attached piston 22 and the piston 12, in the direction of chamber 29. At this time piston 11 is restrained, by engagement with shoulder 13, from movement with piston 21, while piston 12 is first moved into engagement with washer 14, whereupon, its further movement moves said washer away from rib 18, and overcomes the opposing action of the respective spring 15. When shoulder 16 on piston 12 comes into engagement with the rib 18, further movement in the direction of chamber 29 ceases, and an extreme right-hand stop position, as viewed in the drawing, of rod 23 is defined.

In traversing from its position in which it is shown in the drawing to its extreme right-hand position, the rod 23, through action between rack 31 and the pinion 3, causes the shaft 1 to be turned from "Stop" position to "Start Ahead" position. So long as chamber 29 remains open to atmosphere and chamber 27 remains charged with fluid under pressure, the device 2 will remain so positioned, holding shaft 1 in "Start Ahead" position.

If chamber 29 remains open to atmosphere and fluid under pressure in chamber 27 is subsequently vented to atmosphere, the respective spring 15 in chamber 29 is rendered effective to move pistons 12 and 22, hence rod 23, in the direction of chamber 25 until washer 14 re-engages the rib 18, whereupon the respective spring 15 is no longer able to effect such movement and said pistons and rod cease movement. In this position of rod 23, piston 22 will be in engagement with wall 20 of piston 12, which in turn will be in substantial engagement with the respective washer 14. During movement of rod 23 from its extreme right-hand position to the new position, through action of rack 31 and pinion 3, the shaft 1 is turned in a counter-clockwise direction from "Start Ahead" position to "Run Ahead" position.

If fluid at the same pressure is now supplied both to the chamber 27 and to the chamber 29, pressure of fluid in these chambers will act on pistons 11, 21 and 12, 22, tending to urge same in the direction of chamber 25. At this time, however, piston 21 is disposed away from wall 20 of piston 11, which will be urged against the respective shoulder 13, and therefore only that pressure of fluid in chamber 27 acting on the area of piston 21 is effective to cause a force thereon tending to move rod 23 toward the right, as viewed in the drawing. At the same time, pressure of fluid in chamber 29, acting on both the area of the piston 12 and the piston 22 is effective to cause a preponderantly greater force to act on rod 23 to oppose action of pressure of fluid in chamber 27 on piston 21, so that said rod is moved toward the left until piston 12 engages the respective shoulder 13. At substantially the same time that piston 12 engages the respective shoulder 13, the piston 21 engages the wall 20 of piston 11 so that opposing forces tending to cause movement of rod 23 are equalized and said rod remains in the position in which it is shown in the drawing, with shaft 1 consequently returned to "Stop" position.

In similar manner, if fluid under pressure in chambers 27, 29 is first vented to atmosphere and the latter chamber subsequently charged with fluid under pressure, through action of pressure of fluid on piston 22, the piston assemblage, with exception of piston 12, will move to an extreme left hand position, defined by engagement of shoulder 16 on piston 11 with the respective shoulder 17, and holding the respective washer 14 disposed away from rib 18 against opposing action of the respective spring 15. In moving to such position, through action between rack 31 on rod 23 and the pinion 3, the shaft 1 is turned to "Start Astern" position.

Also in manner as aforedescribed, if fluid under pressure in chamber 29 is now vented to atmosphere, the respective spring 15 acting through washer 14 moves piston 11 in the direction of chamber 25 to a position defined by contact of said washer with the respective rib 18. This movement of piston 11 carries with it the piston 21 and attached rod 23 which causes, through pinion 3, shaft 1 to be turned to "Run Astern" position.

Again, if fluid at the same pressure is then supplied simultaneously to both chambers 27 and 29 an unbalance in forces acting on rod 23 is resultant which is in favor of moving said rod in the direction of the right hand, as viewed in the drawing, until piston 11 engages the respective shoulder 13. At this time opposite forces on rod 23 will be equalized, as aforedescribed, and said rod will remain in the position in which it is shown in the drawing, with shaft again in "Stop" position.

The operator's control valve device 4 may be of the type described in detail in Patent No. 2,433,916, issued to H. C. May et al. on January 6, 1948, and briefly, may comprise an operator's control lever 35 adapted to be moved to various positions within a guide slot 36 to control valve means (not shown) for controlling supply and release of fluid under pressure to and from a start pipe 37, a speed control pipe 38, an astern pipe 39 and an ahead pipe 40.

In operation of the control valve device 4, only supply and release of fluid under pressure to and from the pipes 37, 39, 40 will be considered herein, since these may be considered to be the control pipes for controlling the above described operation of the maneuvering motor 2. Device 4 is adapted to effect variations in pressure of fluid in pipe 38 for controlling speed of the engine or engines, but since such control forms no part of the present invention, description of same will be omitted herein.

By movement of lever 35 to various positions in one direction toward "Ahead" and in the opposite direction toward "Astern," operation of motor 2 and thereby starting, running, reversing and stopping of the Diesel engine may be controlled.

With lever 35 of the control valve device 4 in "Stop" position, in which position it is shown in the drawing, pipes 37, 39, 40 are vented to atmosphere.

As lever 35 is moved out of "Stop" position in the direction titled "Ahead" toward the respective "Run and Idle" position, the ahead pipe 40 is charged with fluid under pressure, while the astern pipe 39 and start pipe 37 remain open to atmosphere.

By subsequently depressing lever 35 into a notch 41 opening out from slot 36 and titled "Start," said lever is thus positioned to effect, through the device 4, supply of fluid under pressure to the start pipe 37, while the ahead pipe 40 remains charged and the astern pipe 39 remains open to the atmosphere.

When lever 35 is then moved out of notch 41 into slot 36 to the adjacent "Run and Idle" position opposite the "Start" position, start pipe 37 is again vented to atmosphere with the astern pipe 39, while the ahead pipe 40 remains charged.

If the lever 35 is returned to "Stop" position, all three pipes 37, 39, 40 again will be vented to atmosphere.

In moving lever 35 in slot 36 in the opposite direction toward "Astern," the astern pipe 39 is supplied with fluid under pressure while pipes 37 and 40 are vented to atmosphere.

When lever 35 is then depressed into a notch 42 opening out from slot 36 it is then in "Start" position at the "Astern" side of "Stop" position. In this "Start" position, the start pipe 37 will be charged with fluid under pressure with the astern pipe 39, while the ahead pipe 40 remains open to atmosphere.

When lever 35 is then moved out of notch 42 into slot 36 it is then in the "Run and Idle" position at the "Astern" side of "Stop" position. In this "Run and Idle" position, the start pipe 37 is again vented to atmosphere with the ahead pipe 40, while the astern pipe 39 remains charged with fluid under pressure.

Upon returning lever 35 to "Stop" position, in which it is shown in the drawing, all three pipes 37, 39, 40 are again vented to the atmosphere.

The relay valve devices 5, 6, 7 are similar and therefore like parts will be designated by the same reference numerals. For the following description of the relay valve devices, reference may be made to any of the relay valve devices 5, 6, 7 shown in the drawing.

Each relay valve device 5, 6, 7 may comprise a casing in which a diaphragm 45 is operatively connected to valves 46, 47 for opening and closing same. When a control chamber 48 at one side of diaphragm 45 is open to atmosphere, a compression spring 49 disposed in an atmospheric chamber 50 at the opposite side of said diaphragm urges same to a normal rest position, in which position it is shown in the drawing. In normal rest position of diaphragm 45, the valves 46, 47 controlled by deflection of said diaphragm will be, respectively, open, and closed. When fluid under pressure is supplied to the control chamber 48, diaphragm 45 will deflect in the direction of chamber 50 against action of spring 49 and will, consecutively, close valve 46 and open valve 47.

Valve 46 is adapted and arranged to control communication between a chamber 51 and a chamber 52 formed within the casing. Valve 47, in turn, is adapted and arranged to control communication between the chamber 52 and a chamber 53, also formed in the casing. A bias spring 54 is disposed in chamber 52 for urging valve 47 toward a closed position.

Valve 46 is operably connected to one end of a stem 55 the opposite end of which is held in engagement with diaphragm 45 by spring 49. A fluted stem 56 associated with valve 46 is slidably mounted in one end of a central bore opening longitudinally through a sleeve member 57 extending from chamber 51 through chamber 53 to chamber 52. To the opposite end of sleeve member 57 is attached valve 47.

Valve 46 when closed is adapted to cooperate with a seat formed in the adjacent end of sleeve member 57 encircling the end of the bore therein, and when open is disposed away from said seat. In open position of valve 46, chamber 51 is open to chamber 52 by way of the unseated valve, fluted stem 56, and the central bore extending through the sleeve member 57. When valve 46 is brought into seating engagement with sleeve member 57, by deflection of diaphragm 45 and through stem 55, the chamber 51 is closed to chamber 52. Once valve 46 is thus seated, subsequent further deflection of diaphragm 45 causes movement of sleeve member 57 in the direction of chamber 52 and thereby unseats the valve 47 attached thereto. With valve 47 unseated, chamber 52 is opened to chamber 53. Conversely, when the valve 47 is closed and the valve 46 subsequently opened, with return of diaphragm 45 to rest position, chamber 52 is again closed to chamber 53 and opened to chamber 51 via the sleeve member 57.

The control chamber 48 is open to a fluid pressure passage 60 adapted to connect to a pipe for conducting fluid under pressure to and from said chamber.

Chamber 50 is constantly open to atmosphere by way of a port 61 opening out through the casing.

Chambers 51, 52, 53 are open respectively to fluid pressure passages 62, 63, 64 which are adapted to be connected to respective pipes for conducting fluid under pressure thereto and therefrom.

It will be seen that when control chamber 48 is open to atmosphere, with valve 46 open and valve 47 closed, the passage 63 will be connected to the passage 62 via chamber 52, sleeve member 57 and chamber 51.

When control chamber 48 is charged with fluid under pressure, with valve 46 consequently closed and valve 47 open, passage 63 will be connected to passage 64, via chamber 52, the unseated valve 47, and chamber 53.

In relay valve device 5, passage 60 is connected to the ahead pipe 40 from the operator's control valve device 4. Passage 60 in the relay valve device 6 is connected to the astern pipe 39 from the operator's control valve device 4, and passage 60 in the relay valve device 7 is connected to a pipe 65 which is in turn connected to the delivery side of a double check valve device 66. One inlet end of the check valve device 66 is connected to the ahead pipe 40, while an opposite inlet end of said device is connected to the astern pipe 39. It will be seen, therefore, that the control chamber 48 in relay valve device 5 will assume the conditions in pipe 40 as determined by the operator's control valve device 4. Similarly, the control chamber 48 in relay valve device 6 will assume the condition of pipe 39; and the control chamber 48 in relay valve device 7 will be charged with fluid under pressure when either pipe 39 or 40 is supplied with fluid under pressure and will be vented to atmosphere only when both of said pipes are so vented.

Passages 62 in both relay valve devices 5, 6 are connected to a pipe 69 which is in turn connected to passage 63 in the relay valve device 7. Passage 62 in relay valve device 7 is connected to a pipe 70 which is adapted to be supplied with fluid under pressure from a source, such as a fluid pressure reservoir 71.

Passage 63 in relay valve device 5 is connected to the pipe 28 leading to chamber 27 in the cylinder device 2, and passage 63 in relay valve device 6 is connected to pipe 30 leading to chamber 29 in said device 2.

Passage 64 in devices 5, 6 are connected to branches of the start pipe 37 leading to the operator's control valve device 4, and passage 64 in the relay valve device 7 is connected to the atmosphere.

Operation

In operation of the fluid pressure control apparatus, assume that the lever 35 in the operator's control valve device 4 is in "Stop" position, in which it is shown in the drawing. Thus pipes 37, 39, 40 will be vented to atmosphere.

With pipes 37, 39, 40 vented to atmosphere, the control chambers 48 in relay valve devices 5, 6, 7 will also be vented. As a result, in each of these relay valve devices, passage 62 is connected to passage 63. Fluid under pressure from reservoir 71 therefore flows via pipe 70, passages 62 and 63 in relay valve device 7, pipe 69, passages 62, 63 in both relay valve devices 5, 6 and pipes 28, 30 to both chambers 27, 29 in the multiple position cylinder device 2. As aforedescribed, with both chambers 27, 29 in cylinder device 2 so charged, said device 2 assumes a position in which shaft 1 is in its "Stop" position, in accordance with "Stop" position of the operator's control valve device 4.

When lever 35 in the operator's control valve device 4 is moved out of "Stop" in slot 36 in the direction of "Ahead," and, consequently, ahead pipe 40 is supplied with fluid under pressure with pipes 37, 39 remaining vented to atmosphere, control chambers 48 in relay valve devices 5, 7 will be charged with fluid under pressure from pipe 40, the latter by way of check valve device 66 and pipe 65, and control chamber 48 in relay valve device 6 will be open to atmosphere via astern pipe 39.

Thus, relay valve devices 5 and 7 are so conditioned that passages 63, 64 therein are connected, while in relay valve device 6, passages 62, 63 remain connected.

Consequently, chamber 27 in cylinder device 2 is vented to the atmosphere by way of pipe 28, passages 63, 64 in relay valve device 5, start pipe 37, and the operator's control valve device 4. Chamber 29 in cylinder device 2 is also vented to the atmosphere by way of pipe 30, passages 63, 62 in relay valve device 6, pipe 69, and passages 63, 64 in relay valve device 7. The position of the parts in cylinder device 2 is not changed and shaft 1 remains in "Stop" position, in which it is shown in the drawing.

When lever 35 is moved into notch 41 to "Start" position on the "Ahead" side of "Stop" position, with pipes 37, 40 consequently supplied with fluid under pressure and pipe 39 vented to atmosphere, the relay valve devices 5, 6, 7 remain positioned as previously described with control chambers 48 in devices 5, 7 charged with fluid under pressure and control chamber 48 in device 6 open to the atmosphere.

Chamber 29 in cylinder device 2 will remain open to the atmosphere by way of pipe 30, passages 63, 62 in relay valve device 6, pipe 69, and passages 63, 64 in relay valve device 7. However, chamber 27 in cylinder device 2 will now be supplied with fluid under pressure from the start pipe 37, which is now charged, by way of passages 64, 63 in relay valve device 5 and pipe 28. As will be understood from previous description, shaft 1 is now caused to assume its "Start Ahead" position, which position is in accord with the position of lever 35 in the operator's control valve device 4.

If lever 35 in the operator's control valve device 4 is then moved out of notch 41 into slot 36 to "Run and Idle" position opposite "Start" position, and the start pipe 37 again vented to atmosphere with pipe 39 also so vented and with pipe 40 still charged with fluid under pressure, it will be seen that relay valve devices 5, 6, 7 still remain in the same position with control chambers 48 in devices 5, 7 charged and control chamber 48 in device 6 vented to atmosphere. Chamber 29 in cylinder device 2 remains open to atmosphere as aforedescribed, and chamber 27 is again vented through pipe 37, which is now open to atmosphere by device 4, by way of passages 64, 63 in relay valve device 5 and pipe 28. The cylinder device 2 now responds to position shaft 1 in "Run Ahead" position, in accordance with conditions established by the operator's control valve device 4.

If lever 35 in the operator's control valve device 4 is again returned to "Stop" position, and pipes 37, 39, 40 again vented to atmosphere, in manner as previously described, relay valve devices 5, 6, 7 will be conditioned again to effect supply of fluid under pressure from reservoir 71 to both chamber 27, 29 in cylinder device 2 for returning shaft 1 to its "Stop" position in accordance with position of said lever 35 in device 4.

When lever 35 in the operator's control valve device 4 is moved away from "Stop" position in the opposite or "Astern" direction, to supply fluid under pressure to the astern pipe 39 with pipes 37, 40 remaining vented to atmosphere, the control chamber 48 in relay valve device 6 is charged with fluid under pressure via said pipe 39, control chamber 48 in relay valve device 7 is also charged with fluid under pressure from said pipe 39 via check valve device 66 and pipe 65, and control chamber 48 in relay valve device 5 is vented to atmosphere via said pipe 40.

In all positions of lever 35 in control valve device 4, on the "Astern" side of "Stop" position, the respective control chamber 48 will remain conditioned as above described. In relay valve devices 6, 7 with fluid under pressure in their control chambers 48, their passages 63, 64 will be connected. In relay valve device 5, with its control chamber 48 vented to atmosphere, its passages 62, 63 will be connected.

In this position of the relay valve devices 5, 6, 7 chamber 29 in the cylinder device 2 is connected via pipe 30, passages 63, 64 in relay valve device 6, to the start pipe 37 from the control valve device 4, which latter pipe will be vented to atmosphere as lever 35 in device 4 is initially moved in slot 36 out of "Stop" position in the "Astern" direction, will be supplied with fluid under pressure when said shaft is moved into "Start" position in notch 42, and again vented to atmosphere when said shaft is returned to "Run Idle" position in said slot. At the same time, chamber 27 will remain open to atmosphere via pipe 28, passages 63, 62 in the relay valve device 5, pipe 69, and passages 63, 64 in the relay valve device 7.

Thus it will be seen that as lever 35 in the operator's control valve device 4 is moved to its various positions on the "Astern" side of its "Stop" position, the chambers 27, 29 in cylinder device 2 first will be vented to atmosphere, then chamber 29 will be supplied with fluid under pressure while chamber 27 remains vented to atmosphere to position shaft 1 in "Start Astern" position corresponding to "Start" position of said lever, and finally chamber 29 will be vented to atmosphere with chamber 27, and shaft 1 will be returned to "Run Astern" position to agree with "Run Idle" position of lever 35 on the "Astern" side of "Stop" position.

As will be appreciated, when lever 35 in the operator's control valve device 4 is returned to its "Stop" position, venting pipes 37, 39, 40 to atmosphere, relay valve devices 5, 6, 7 will again respond, as previously described, to simultaneously effect supply of fluid under pressure to both chamber 27, 29 in cylinder device 2 to return shaft 1 to its "Stop" position in accord with position of said shaft.

*Summary*

It will be seen from the preceding description that I have provided fluid pressure control apparatus for controlling operation of a fluid pressure five position cylinder device for positioning a maneuvering shaft or the like.

The five position cylinder device is operable to certain positions, corresponding to different conditions required for starting, stopping, reversing and running of a Diesel engine, in response to a certain selective establishment of pressure of fluid in two pipes connected therewith. By provision of an operator's control device operable to five positions, corresponding to the positions of the five position cylinder device, for effecting a certain selective establishment of pressure of fluid in three pipes, together with relay valve means connected with the three pipes and with the above mentioned two pipes, I have provided a means for controlling operation of the five position cylinder device.

While in the above description the terms ahead and astern have been employed, it is desired to point out that these terms, which are particularly directed to ship movement in connection with a reversible Diesel engine, are to be considered synomymous with forward and reverse, or one direction and opposite direction, respectively.

Having now described the invention, what I claim as new and desire to secure by Letters Patent, is:

1. Fluid pressure control apparatus comprising in combination, two pipes, a fluid pressure motor device connected with said two pipes and operable to a chosen position in response to establishment of pressure of fluid in said two pipes, three pipes, a control valve device connected with said three pipes and operable to a position to vent said three pipes to atmosphere, and relay valve means connected with said three pipes and with said two pipes and responsive to venting of said three pipes to atmosphere to effect said establishment of pressure of fluid in said two pipes.

2. Fluid pressure control apparatus comprising in combination, a fluid pressure motor device having two chambers therein, said motor device adapted to assume, a first position when said two chambers are charged with fluid under pressure, a second position when only one chamber of said chambers is charged with fluid under pressure, a third position when fluid under pressure subsequently is released from said one chamber, a fourth position when only the other of said chambers is charged with fluid under pressure and a fifth position when fluid under pressure subsequently is released from said other chamber, control valve means having first, second, and third control pipes connected thereto, said control valve means being operable to, a first position for venting said control pipes to atmosphere, a second position for charging only said first and third control pipes with fluid under pressure, a third position for subsequently releasing fluid under pressure from said third control pipe, a fourth position for charging only said second and third control pipes with fluid under pressure, and a fifth position for subsequently releasing fluid under pressure from said third control pipe, and fluid pressure relay valve means connected with and controlled by pressure in said first, second and third control pipes and also connected with said two chambers and assuring coincidence between positions of said cylinder means and positions of said control valve means.

3. In combination, first and second control pipes, a motor device arranged for control by pressure of fluid in said pipes, a third pipe, a fourth pipe, first and second relay valve means operable by fluid under pressure to connect, respectively, said first and second control pipes to said third pipe and operable upon release of fluid under pressure to connect respectively said control pipes to said fourth pipe, a source of fluid under pressure, a third relay valve means operable by fluid under pressure to connect said third pipe to atmosphere and upon release of fluid under pressure to connect said third pipe to said source of fluid under pressure, and an operator's control device for selectively supplying fluid under pressure to operate either one of said first or second relay valve means while opening a fluid pressure release communication to the other and for at the same time either supplying fluid under pressure to or opening a fluid pressure release communication from said third relay valve means.

4. In combination, first and second control pipes, double acting motor means arranged for control by pressure of fluid in said pipes, a third pipe, a fourth pipe, first and second relay valve means operable by fluid under pressure to connect, respectively, said first and second control pipes to said third pipe and operable upon release of fluid under pressure to connect respectively said control pipes to said fourth pipe, a source of fluid under pressure, a third relay valve means operable by fluid under pressure to connect said third pipe to atmosphere and upon release of fluid under pressure to connect said third pipe to said source of fluid under pressure, a fifth pipe for conveying fluid under pressure to and releasing fluid under pressure from said first relay valve means, a sixth pipe for conveying fluid under pressure to and releasing fluid under pressure from said second relay valve means, means including a double check valve for conveying fluid under pressure to said third relay valve means upon supply of fluid under pressure to either said fifth pipe or said sixth pipe and for releasing fluid under pressure therefrom upon release of fluid under pressure from both said fifth and sixth pipes, and operator's control means for venting said fifth and sixth pipes at the same time and for also selectively supplying fluid under pressure to either one while establishing a fluid pressure release communication from the other and for at the same time selectively supplying fluid under pressure to or releasing fluid under pressure from said third pipe.

ROY R. STEVENS.

REFERENCES CITED

The following references are of record in the file of this patent:

UNITED STATES PATENTS

| Number | Name | Date |
|---|---|---|
| 1,806,669 | Campbell | May 26, 1931 |
| 2,438,427 | Whitney | Mar. 23, 1948 |